US012685624B2

(12) United States Patent
Newman et al.

(10) Patent No.: US 12,685,624 B2
(45) Date of Patent: Jul. 21, 2026

(54) ELECTRIC TOOTHBRUSH AND UNIVERSAL BASE THEREFOR

(71) Applicant: Braun GmbH, Kronberg (DE)

(72) Inventors: Matthew Lloyd Newman, Oberursel (DE); Matthias Paschold, Mainz-Kastel (DE)

(73) Assignee: Braun GmbH, Kronberg (DE)

( * ) Notice: Subject to any disclaimer, the term of this patent is extended or adjusted under 35 U.S.C. 154(b) by 574 days.

(21) Appl. No.: 17/880,869

(22) Filed: Aug. 4, 2022

(65) Prior Publication Data

US 2023/0045594 A1 Feb. 9, 2023

Related U.S. Application Data

(60) Provisional application No. 63/230,181, filed on Aug. 6, 2021.

(51) Int. Cl.
 *A61C 17/22* (2006.01)
 *A46B 9/04* (2006.01)
 (Continued)

(52) U.S. Cl.
 CPC .............. *A61C 17/224* (2013.01); *A46B 9/04* (2013.01); *A46B 15/0006* (2013.01);
 (Continued)

(58) Field of Classification Search
 CPC ........... A46B 15/0002; A46B 15/0006; A46B 15/0008; A46B 15/0012; A46B 15/0044;
 (Continued)

(56) References Cited

U.S. PATENT DOCUMENTS 5,864,288 A 1/1999 Hogan
D548,179 S 8/2007 Vu
 (Continued)

FOREIGN PATENT DOCUMENTS

CN 102427862 A 4/2012
CN 112294481 A * 2/2021 ............. A61C 17/34
 (Continued)

OTHER PUBLICATIONS

PCT Search Report and Written Opinion for PCT/IB2022/057260 dated Nov. 11, 2022,11 pages.
 (Continued)

*Primary Examiner* — Laura C Guidotti
(74) *Attorney, Agent, or Firm* — Jay A. Krebs

(57) ABSTRACT

An electric toothbrush, in combination with a universal base for receiving and wirelessly charging the toothbrush, the base to be coupled with the electric toothbrush for wireless communication therebetween. The base comprises a magnetic element for forming a magnetic connection with the electric toothbrush when the latter is received by the base for charging. The base includes a charging component for inductively charging the electric toothbrush, a Bluetooth component for communicating usage data received from the toothbrush during a brushing session, an analyzing component for instantaneous processing of the usage data received from the toothbrush, a timer-clock component for displaying either a count-up or a countdown of the brushing session during the brushing session and time of day before and after the brushing session, and a multi-functional light component for instantaneously communicating, during the brushing session, at least one element of the usage data.

19 Claims, 8 Drawing Sheets

(51) Int. Cl.
| | |
|---|---|
| *A46B 15/00* | (2006.01) |
| *H02J 7/70* | (2026.01) |
| *H02J 50/10* | (2016.01) |

(52) U.S. Cl.
CPC ...... *A46B 15/0008* (2013.01); *A46B 15/0036* (2013.01); *A46B 15/0044* (2013.01); *H02J 7/731* (2026.01); *H02J 50/10* (2016.02); *A46B 15/004* (2013.01); *A46B 2200/1066* (2013.01)

(58) Field of Classification Search
CPC .............. A46B 15/004; A46B 15/0036; A46B 15/0095; A46B 9/04; A46B 2200/1066; A61C 17/221; A61C 17/224; H02J 7/0044; H02J 50/10
See application file for complete search history.

(56) References Cited

U.S. PATENT DOCUMENTS

| | | | |
|---|---|---|---|
| D661,930 S | 6/2012 | Gebski | |
| D682,198 S | 5/2013 | Vu | |
| 8,533,892 B2 * | 9/2013 | Dabrowski .......... | A61C 17/221 15/22.1 |
| D694,182 S | 11/2013 | Lee et al. | |
| D718,236 S | 11/2014 | Murray | |
| D757,014 S | 5/2016 | Hahn et al. | |
| D768,570 S | 10/2016 | Shigeno et al. | |
| D768,571 S | 10/2016 | Shigeno et al. | |
| D772,813 S | 11/2016 | Wahl | |
| D774,455 S | 12/2016 | Kim et al. | |
| D784,259 S | 4/2017 | Huang et al. | |
| D786,193 S | 5/2017 | Akana et al. | |
| D789,373 S | 6/2017 | King | |
| D794,557 S | 8/2017 | Kim | |
| D795,182 S | 8/2017 | Akana et al. | |
| D797,042 S | 9/2017 | Miller et al. | |
| D798,808 S | 10/2017 | Ptok et al. | |
| D810,015 S | 2/2018 | Carreon et al. | |
| D810,680 S | 2/2018 | Carreon et al. | |
| D837,148 S | 1/2019 | Brown | |
| D839,189 S | 1/2019 | Miller et al. | |
| D850,367 S | 6/2019 | Xiong et al. | |
| D850,372 S | 6/2019 | Kong et al. | |
| D866,459 S | 11/2019 | Huang | |
| D870,663 S | 12/2019 | Schubert et al. | |
| D870,664 S | 12/2019 | Langhammer | |
| D870,665 S | 12/2019 | Schubert et al. | |
| D872,015 S | 1/2020 | Choi et al. | |
| D875,678 S | 2/2020 | Kim et al. | |
| D884,624 S | 5/2020 | Lei | |
| D886,052 S | 6/2020 | Albay et al. | |
| D901,379 S | 11/2020 | Choi et al. | |
| D913,222 S | 3/2021 | Albay et al. | |
| D917,390 S | 4/2021 | Tung | |
| D918,135 S | 5/2021 | Akana et al. | |
| 11,025,093 B2 | 6/2021 | Schaefer et al. | |
| D931,860 S | 9/2021 | Chin | |
| D935,395 S | 11/2021 | Chen et al. | |
| D935,448 S | 11/2021 | Lee | |
| D937,204 S | 11/2021 | Okai et al. | |
| D937,205 S | 11/2021 | Okai et al. | |
| D945,364 S | 3/2022 | Chang et al. | |
| D967,014 S | 10/2022 | Langhammer et al. | |
| D967,015 S | 10/2022 | Langhammer et al. | |
| D975,010 S | 1/2023 | Tung | |
| D977,424 S | 2/2023 | Wang | |
| D978,074 S | 2/2023 | Kiveläet al. | |
| D986,822 S | 5/2023 | Wu | |
| 11,755,686 B2 | 9/2023 | Sherman | |
| D1,006,739 S | 12/2023 | Li | |
| D1,019,556 S | 3/2024 | Wang | |
| D1,021,774 S | 4/2024 | Bennett et al. | |
| D1,025,899 S | 5/2024 | Bressan | |
| D1,030,651 S | 6/2024 | Akana et al. | |
| D1,039,493 S | 8/2024 | Liu | |
| D1,055,847 S | 12/2024 | Shen | |
| 2006/0176017 A1 * | 8/2006 | Waguespack ......... | H02J 7/0049 320/115 |
| 2008/0109973 A1 | 5/2008 | Farrell | |
| 2010/0289448 A1 | 11/2010 | Jung et al. | |
| 2013/0193915 A1 * | 8/2013 | Jung ..................... | H02J 7/0044 320/108 |
| 2015/0230899 A1 | 8/2015 | Vetter et al. | |
| 2017/0110911 A1 | 4/2017 | Bossetti et al. | |
| 2018/0062414 A1 | 3/2018 | Chiu et al. | |
| 2019/0200746 A1 * | 7/2019 | Serval ............... | A46B 15/0008 |
| 2020/0268141 A1 | 8/2020 | Newman et al. | |
| 2020/0397546 A1 * | 12/2020 | Miller ...................... | H02J 7/00 |
| 2023/0216341 A1 | 7/2023 | Alam et al. | |
| 2023/0301408 A1 | 9/2023 | Chawan et al. | |
| 2023/0342423 A1 | 10/2023 | Sherman et al. | |

FOREIGN PATENT DOCUMENTS

| | | | | |
|---|---|---|---|---|
| GB | 2519579 A | | 4/2015 | |
| JP | H05161508 A | * | 6/1993 | ............. A46B 13/02 |
| JP | 2020504664 A | | 2/2020 | |
| WO | 2010129755 A1 | | 11/2010 | |

OTHER PUBLICATIONS

PCT Search Report and Written Opinion for PCT/IB2022/057262 dated Dec. 2, 2022,11 pages.

All Office Actions; U.S. Appl. No. 17/880,856, filed Aug. 4, 2022.

All Office Actions; U.S. Appl. No. 17/890,433, filed Aug. 18, 2022.

Unpublished U.S. Appl. No. 17/880,856, filed Aug. 4, 2022, to Matthew Lloyd Newman et al.

Unpublished U.S. Appl. No. 17/890,433, filed Aug. 18, 2022, to Torsten Klemm et al.

"Electric Toothbrush Replacement Charger for Braun Oral-B Electric Toothbrush, Inductive Charging Base Portable Oral-B Waterproof Power Cord Environmental ABS, Model 3757 by LAP POW (White)", Amazon, URL: https://www.amazon.com/dp/BO7MDJRWZQ, first available on May 23, 2007, 10 pages.

"Replacement Electric Toothbrush Charger Fit for Oral B, Inductive Charger Base Compatible with Braun Electric Toothbrush, Portable Environmental ABS Fit for Oral B Electric Toothbrush", Amazon, URL: https://www.amazon.com/dp/B0B3CSKMGV, first available on Jul. 14, 2018, 10 pages.

* cited by examiner

ELECTRIC TOOTHBRUSH AND UNIVERSAL BASE THEREFOR

FIELD OF THE INVENTION

The present disclosure is concerned with an electric toothbrush, in combination with a universal base structured and configured to receive the toothbrush for wireless charging and coupling for wireless communication therebetween, providing an oral-care analyzing and monitoring functions.

BACKGROUND OF THE INVENTION

Inductively coupled power-transfer methods and systems are known in the art, particularly in the field of inductively charging electric-power handheld tools and personal devices, such as, e.g., electric toothbrushes. For example, a commonly assigned U.S. Pat. No. 10,218,212, incorporated herein by reference, discloses a wireless charging device.

It is generally known in the field of oral care that monitoring, recording, and classification of the usage of an electric toothbrush can be desirable for particular applications. For example, the position/location of the toothbrush in the user's mouth relative to the teeth during brushing could be determined by computing the posture of the toothbrush based on data from a triaxial accelerometer and a terrestrial magnetism sensor. This is described in US 2010/0145654 A1, the disclosure of which is incorporated herein by reference.

A commonly assigned Patent Application US 2019/0278786, the disclosure of which is incorporated herein by reference, describes a system for classifying the usage of a handheld consumer device, including a toothbrush. The disclosed system comprises a movable handheld device that includes a sensor unit for determining at least one usage data at successive time instants and an analyzing unit. The sensor unit can be arranged to provide a temporally successive sequence of usage data during a usage session.

The analyzing unit can be arranged to classify the usage of the device with respect to at least one set of usage classes relating to different usage properties and to assemble a temporally successive sequence of input tuples of usage data relating to a predetermined time period of the usage session, each of the input tuples having at least one element representing the usage data at the respective time instant. The analyzing unit can be arranged to input the sequence of input tuples into at least one artificial neural network arranged to output at least one output tuple that comprises a number of elements in accordance with the number of usage classes, each element of the output tuple representing a prediction value that the usage of the consumer device at the given time instant relates to a respective usage class.

A "usage class" is an output class of an artificial neural network (ANN) and is defined by the designer of the ANN. In the context of the present disclosure, the usage class relates to the usage of an electric toothbrush and differentiates between different usage properties. The usage of an electric toothbrush is essentially determined by a temporal sequence of usage data that may include at least one of motion data, including orientation data; force data; capacitive data relating to the environment of the toothbrush; temperature data; audio data; picture and/or video data; barometric data; pH data; et cetera.

The classification may be performed with respect to a target space comprising a target surface; and the device may be arranged for treating the target surface. The artificial neural network may be arranged to output a sequence of output tuples, in particular a sequence of output tuples having the same length as the sequence of input tuples. A single usage-class answer per predetermined time period may be determined based on the sequence of output tuples, e.g., by applying a majority criterion and/or a maximum criterion, in particular after applying an argmax function on each output tuple.

It has now been discovered that a "live" classification (i.e., the classification of the usage and related data while the toothbrush is being used) can be communicated to the user via a universal charging unit that comprises, aside from a charging component, components for analyzing and communicating the usage data during a brushing session. Such analysis and communication facilitates a holistic and comprehensive understanding by the user of the usage data information during the completed brushing session.

Consequently, the present disclosure is concerned with a universal base for an electric toothbrush, wherein the base is structured and configured to be coupled with the electric toothbrush for inductive charging the toothbrush when the toothbrush is inductively coupled with the base, and for wireless communication between the base and the toothbrush during a brushing session.

SUMMARY OF THE INVENTION

A universal base for an electric toothbrush is structured and configured to be coupled with the electric toothbrush for wireless communication therebetween during and after a brushing session. The base has a body comprising a top surface, a bottom surface opposite to the top surface, and a side surface extending between the top and bottom surfaces. The base comprises a charging component for inductively charging the electric toothbrush when the toothbrush is placed upon the top surface of the universal base; a Bluetooth component for communicating (receiving and sending) usage data from the electric toothbrush during and after a brushing session; an analyzing component arranged for instantaneous processing of the usage data received from the electric toothbrush during the brushing session; a timer-clock component, including a timer-clock display, for displaying (a) either a count-up or a countdown of the brushing session during the brushing session, and (b) time of day before and after the brushing session; and a multi-functional light component for communicating, including instantaneously communicating during the brushing session, at least one element of the usage data. In one embodiment, the universal base may comprise a Wireless Local Area Network (WLAN) component for communicating the usage data between the universal base and at least one of a smart-device application, another universal base, and the cloud. Transmission (sending and receiving) of the usage data may occur, e.g., at 2.4 GHz or 5 Ghz. WLAN may also allow updating the device, e.g., for safety and functionality reasons. As used herein, the term "instantaneous processing" refers to data processing as the data comes in, during a brushing session, including buffer and/or OS delays, if any, that could occur during conventional industry-standard processing. Instantaneous processing may not be synonymous with what is known as "real-time" processing. Likewise, the term "instantaneous communicating" refers to communication of data as the processed data comes in, during a brushing session. As used herein, the term "usage data" includes at least one data point/element calculated from transmitted raw data.

The at least one element of the usage data may be selected from the group consisting of a battery charging status, a pressure applied by a user during the brushing session, a position or orientation of the toothbrush relative to the teeth of the user, a portion of the teeth being brushed, a progress of the brushing session (including an estimation of a portion of completion of brushing of pre-designated dental surfaces), and any combination thereof. In one embodiment, the base may include an audio component including a speaker for communicating information and/or usage data to a user. Disclosures of commonly assigned U.S. patent application Ser. No. 16/276,972 (US Publication 2019/0254794 A1), U.S. patent application Ser. No. 16/276,993 (US Publication No. 2019/0254795 A1), U.S. patent application Ser. No. 16/277,024 (US Publication No. US 2019/0254796 A1), and U.S. patent application Ser. No. 16/276,947 (US Publication No. US 2019/0278786 A1), each filed on Feb. 15, 2019, are incorporated herein by reference.

The light component may be structured and configured to be visible during the brushing session and invisible before and after the brushing session. As used herein, "invisible" refers to a quality of the light component of being not readily noticeable by a naked human eye under most typical ambient light conditions, such as those commonly found in a bathroom. The light component may also be arranged to be visible before and after a brushing session for the purpose of changing color of the light, for example.

In one embodiment, the light component may be structured and configured to emit light selected from the group consisting of ambient light and night light before and after the brushing session. The light component may be further structured and configured to emit light having a variety of personalized colors and a variety of personalized intensities. For example, the light component may be structured and configured to emit at least one of a first personalized color and a first personalized brightness chosen by a first user. In one embodiment, the light component can be structured and configured to emit light having at least one of a second personalized color and a second personalized brightness chosen by a second user, wherein the first personalized color differs from the second personalized color and the first personalized brightness differs from the second personalized brightness. In one embodiment, the light component may be structured and configured to comprise a plurality of segments, each being arranged to communicate the usage data with respect to brushing various portions of the teeth of a user.

In one embodiment, the light component may comprise a plurality of light segments, e.g., six curved light segments, wherein each of the six segments is arranged to communicate the usage data with respect to brushing each of at least six portions of the teeth. The six portions of the teeth may be chosen to comprise a portion including maxillary (upper) left posterior teeth, a portion including maxillary right posterior teeth, a portion including maxillary anterior teeth, a portion including mandibular (lower) left posterior teeth, a portion including mandibular right posterior teeth, and a portion including mandibular anterior teeth. In another embodiment (not shown), the plurality of curved light segments of the multi-functional light component may comprise four curved segments—or any other suitable number of light segments, e.g., eight segments. The light component may be structured and configured to communicate the usage data with respect to brushing each of buccal, lingual, occlusal, and incisal surfaces of the maxillary and mandibular teeth. The terms "teeth" and "dentition" are used herein synonymously.

The body of the base may be structured and configured to have a substantially circular or round shape, wherein the top surface has a first (outside) diameter of from about 45 mm to about 90 mm, more specifically from about 60 mm to about 75 mm, and even more specifically from about 65 mm to about 70 mm, wherein each of the top and bottom surfaces is round and the side surface is annular. The base may have a height of from about 20 mm to about 40 mm, measured from the lowest point of the bottom surface to the highest point of the top surface, wherein the highest point is situated in a geometric center of the top surface. The highest point on the top surface is part of the top surface's central portion that has a shape of a slightly convex and generally smooth protrusion having a shape of a spherically convex curvature having a radius of from about 15 mm to about 35 mm, and more specifically from about 20 mm to about 30 mm; and a plane-view diameter of from about 10 mm to about 35 mm, and more specifically from about 15 mm to about 25 mm.

The base has a height of from about 20 mm to about 40 mm, measured from the lowest point of the bottom surface to the highest point of the top surface, wherein the highest point can be beneficially situated at or adjacent to the geometric center of the top surface. The central portion may have a shape of a slightly convex and generally smooth protrusion having a shape of a spherically convex curvature having a radius of from about 15 mm to about 35 mm and a plane-view diameter of from about 10 mm to about 35 mm. In another embodiment, the spherically convex curvature has a radius of from about 20 mm to about 30 mm and a plane-view diameter is from about 15 mm to about 25 mm. In still another embodiment, the central portion may have a generally parabolic shape. The convex and smooth protrusion of the central portion may have a height of from about 0.5 mm to about 3 mm, more specifically from about 1 mm to about 2 mm, and even more specifically about 1.5 mm.

The multi-functional light component can be disposed at the top surface and adjacent to an outer perimeter thereof. The light component may comprise a plurality of curved segments, some of which are positioned substantially equidistantly from the outer perimeter and forming, in combination with one another, a circle having a second diameter of from about 35 mm to about 75 mm, more specifically from about 45 mm to about 65 mm, and even more specifically from about 50 mm to about 60 mm, concentric with the first diameter. The timer-clock component may be configured to display information at the side surface.

In one embodiment, the side surface is disposed at an included angle of about 90 degrees relative to the top surface. In another embodiment, the side surface is disposed at an included angle of less than about 90 degrees, e.g., an angle of between about 80 degrees and about 90 degrees, or an angle of between about 70 degrees and about 80 degrees, or an angle of between about 60 degrees and 70 degrees, or an angle of between 50 degrees and 60 degrees, or an angle of between about 40 degrees and 50 degrees, or an angle between 30 degrees and about 40 degrees, relative to the bottom surface. As used herein, the term "an angle of about X degrees" encompasses an angle of $(X\pm2)$ degrees.

In still another embodiment, a first portion of the side surface is disposed at an included angle of about 90 degrees relative to the bottom surface and a second portion of the side surface is disposed at an included angle of less than about 90 degrees (e.g., at the angles indicated above) relative to the bottom surface. In such an embodiment, a geometric center of the side surface's first portion can be arranged to be approximately opposite to a geometric center of the side surface's second portion. Then, the timer-clock component 190 may be configured to display information at the second (inclined) portion of the side surface.

Each of the top surface and the side surface can be beneficially structured and configured to be substantially smooth and devoid of recesses, edges, corners, and the like, susceptible to accumulation of undesirable residual dentifrice, fluids, and waste elements. As used herein, the term "smooth" refers to the surface's quality of having an essentially even and regular exterior or consistency, free from perceptible sharp protrusions, recesses, corners, turns, lumps, edges, indentations, and the like, susceptible to accumulation of residual dentifrice and other products of waste resulting from brushing.

The base comprises a magnetic element structured and configured to form a magnetic connection with an electric toothbrush when the toothbrush is received by the base for inductive charging of its rechargeable battery. A commonly assigned U.S. Pat. No. 11,025,093 B2, the disclosure of which is incorporated herein by reference, describes a personal-care product system including a stand having docking magnets. U.S. Pat. No. 9,143,041, the disclosure of which is incorporated hereon by reference, describes a magnetic circuit for a non-contact charging apparatus. An electric toothbrush, or a handle for an electric toothbrush, having a maximal equivalent diameter dmax, can be placed, in a vertical position, on the top surface of the base, wherein the magnetic connection between the base's magnetic element and the toothbrush handle's magnetic element is established, thereby facilitating an inductive coupling between the transmitter coil of the base and the receiver coil of the toothbrush, thus enabling wireless charging of the battery disposed in the handle can occur.

As used herein, the term "equivalent diameter" refers to a toothbrush's maximal cross-sectional dimension measured in any cross-section substantially perpendicular to the toothbrush's longitudinal (axial) extension. The maximal equivalent diameter dmax is the toothbrush's largest equivalent diameter found anywhere along the toothbrush's longitudinal extension. In one embodiment, the first diameter is at least 1.5 times greater than the maximal equivalent diameter dmax. In another embodiment, the first diameter is at least 2 times greater than the maximal equivalent diameter dmax.

In one embodiment of the base, the analyzing component is arranged for classifying the usage data with respect to at least one set of at least two usage classes relating to different usage properties. The analyzing component can be arranged for assembling a temporally successive sequence of input tuples of usage data relating to a time period of the brushing session. Each of the input tuples can comprise at least one element representing the usage data at the respective time instant and for inputting the sequence of input tuples into at least one artificial neural network arranged to output at least one output tuple comprising a number of elements in accordance with the number of usage classes. Each element of the output tuple can represent a prediction value that the usage of the consumer device at the given time instant relates to a respective usage class. The analyzing component can be arranged to determine a single usage class answer for the time period based on the sequence of output tuples.

DETAILED DESCRIPTION OF THE INVENTION

Figure 1:
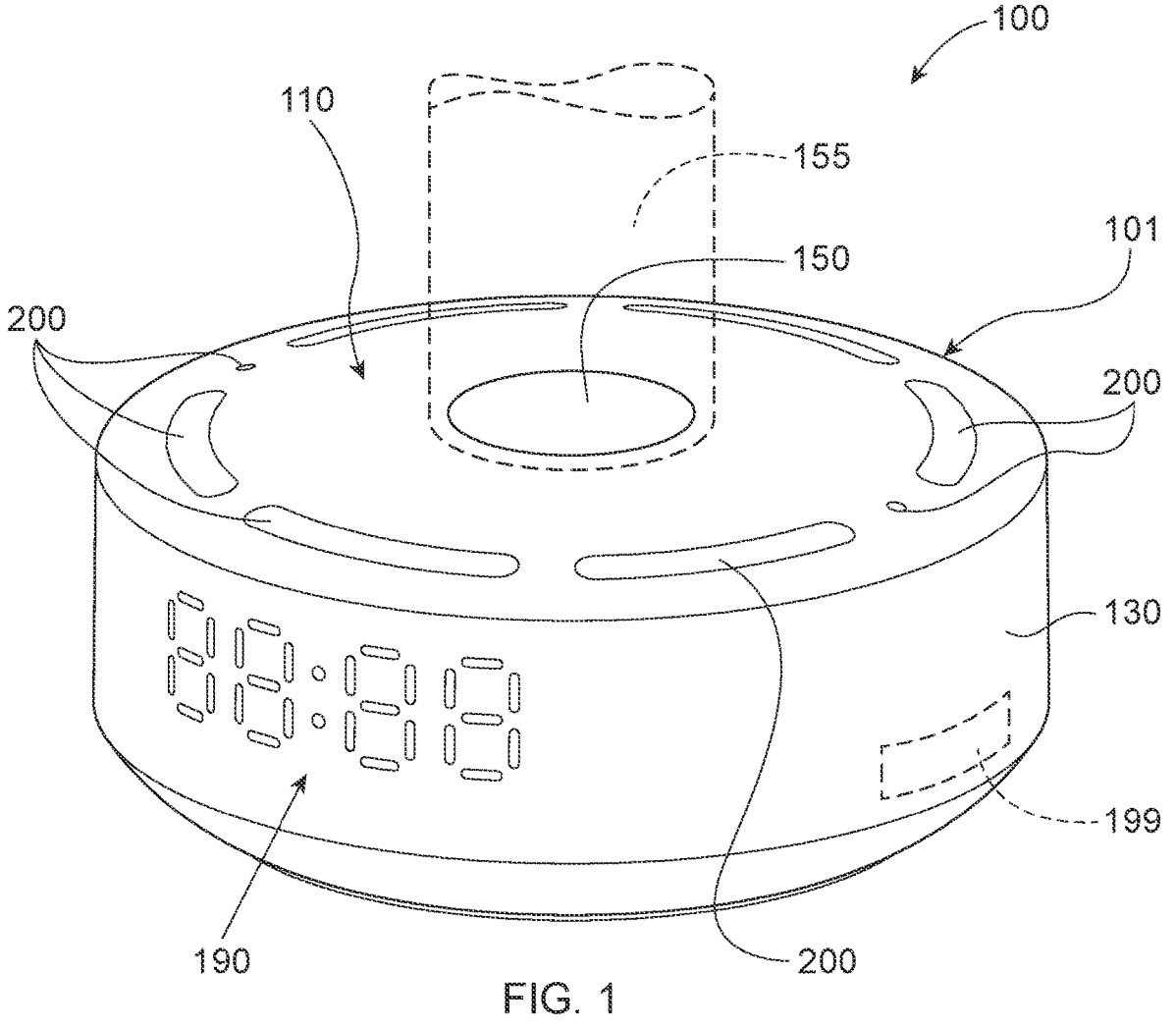
FIG. 1 is a schematic perspective view of the universal base of the present disclosure according to one embodiment.
Figure 2:
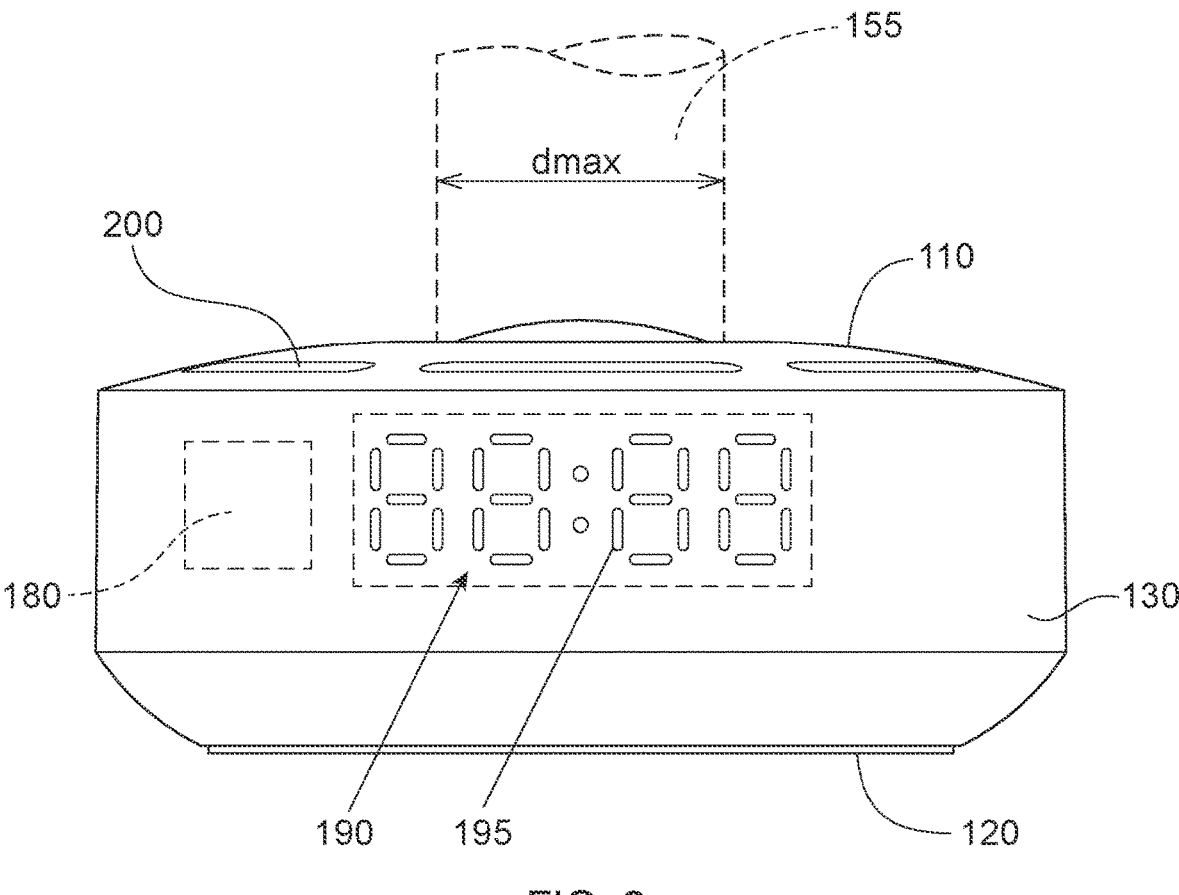
FIG. 2 is a schematic front view of the base shown in FIG. 1.
Figure 3:
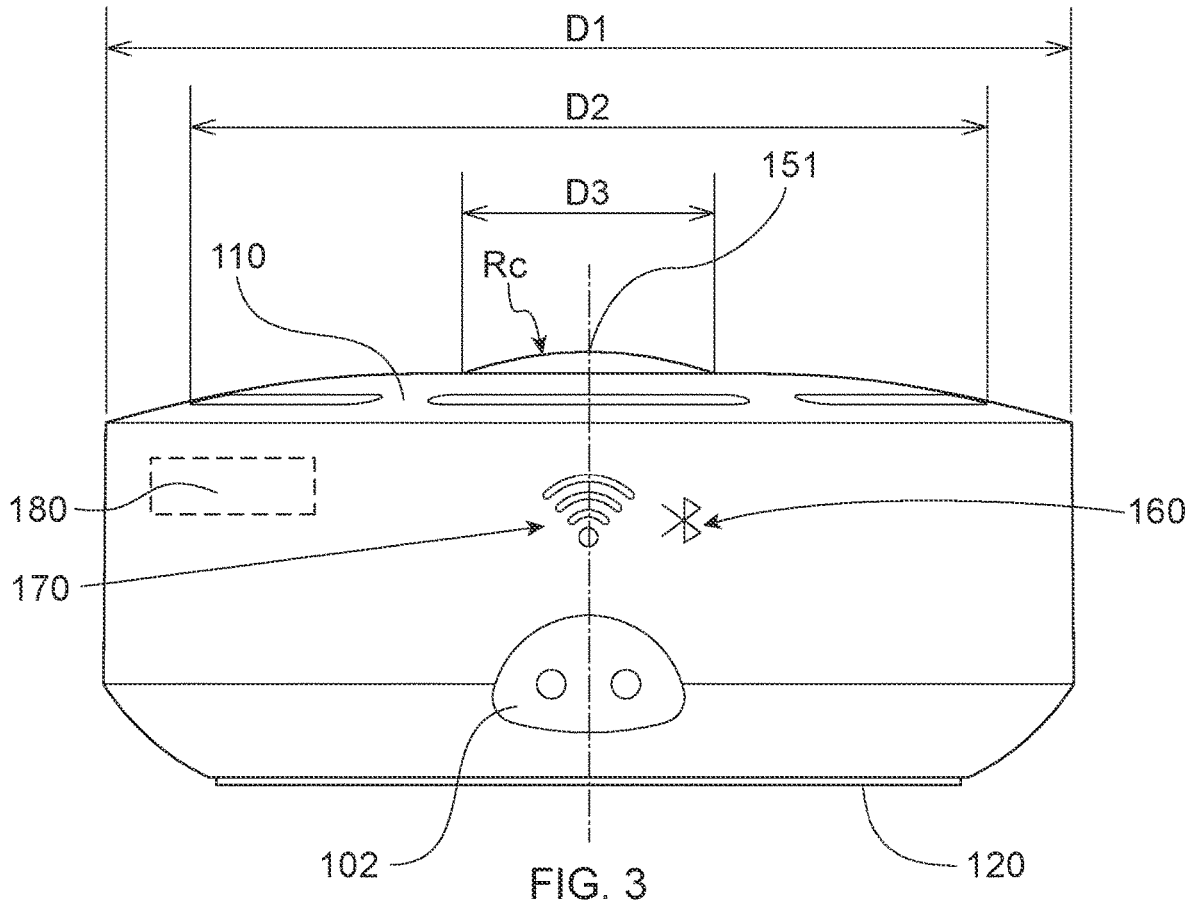
FIG. 3 is a schematic back view of the base shown in FIG. 1.
Figure 4:
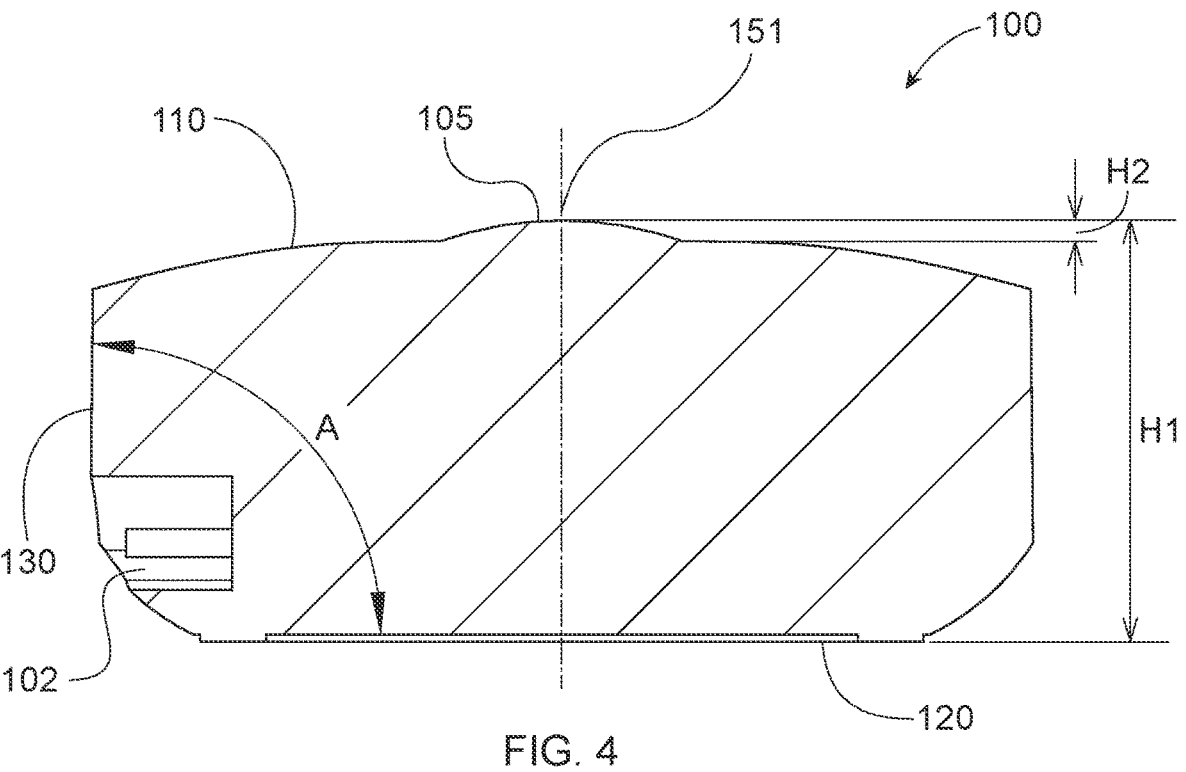
FIG. 4 is a schematic cross-sectional view of the base shown in FIG. 1.

A universal base (or simply "base") 100 is structured and configured to perform at least two major functions: (1) inductively charging a toothbrush's rechargeable battery when the toothbrush is placed on the base and is thus inductively coupled with a transmitter (charging) coil of the base; and (2) wirelessly communicating with the toothbrush and other devices, such as, e.g., a smart phone, a tablet and a cloud, and/or another (second) universal base. The wireless communication can beneficially take place during a brushing session when the toothbrush is removed from the base 100. The base 100 may include a timer-clock component 190, comprising a timer-clock display 195 (FIGS. 1 and 2), for displaying (a) either a count-up or a countdown of the brushing session during the brushing session, and (b) time of day before and after the brushing session. The base can be arranged to be electrically powered, by a suitable cable, via a conventional interface 102 (FIGS. 3 and 4) from a power outlet.

An embodiment of the base 100 is illustrated in FIGS. 1-6. The base 100 has a body 101 comprising a top surface 110, a bottom surface 120 opposite to the top surface 110, and a side surface 130 extending between the top and bottom surfaces 110, 120. In one embodiment, the light component 200 may comprise a plurality of light segments, e.g., six curved light segments 210. In the embodiment illustrated in FIGS. 1-6, the body of the base 100 has a substantially circular shape, wherein the top surface 110 has a first diameter D1. In the embodiment shown, each of the top and bottom surfaces 110, 120 is substantially round, and the side surface 130 is annular. The first diameter D1 can be from about 45 mm to about 90 mm, more specifically from about 60 mm to about 75 mm, and even more specifically from about 65 mm to about 70 mm.

In one embodiment, the first diameter D1 of the top surface 110 is at least 1.5 times greater than the maximal equivalent diameter dmax of the toothbrush 155 to be inductively coupled with the base 100. In another embodiment, the first diameter D1 is at least 2 times greater than the toothbrush's maximal equivalent diameter dmax.

The base 100 has a height H1 of from about 20 mm to about 40 mm, measured from the lowest point of the bottom surface 120 to the highest point of the top surface 110, wherein the highest point can be beneficially situated at or adjacent to a geometric center 151 of the top surface 110. The highest point of the top surface 110 is part of a central portion 105 of the top surface 110. The central portion 105 may have a shape of a slightly convex and generally smooth protrusion having a shape of a spherically convex curvature having a radius Rc of from about 15 mm to about 35 mm and a plane-view diameter D3 of from about 10 mm to about 35 mm. In a further embodiment, the spherically convex curvature has a radius of from about 20 mm to about 30 mm and a plane-view diameter is from about 15 mm to about 25 mm. In still another embodiment, the central portion 105 may have a generally parabolic shape. The convex and smooth protrusion of the central portion 105 may have a height H2 of from about 0.5 mm to about 3 mm, more specifically from about 1 mm to about 2 mm, and even more specifically the height H2 is about 1.5 mm.

Figure 7:
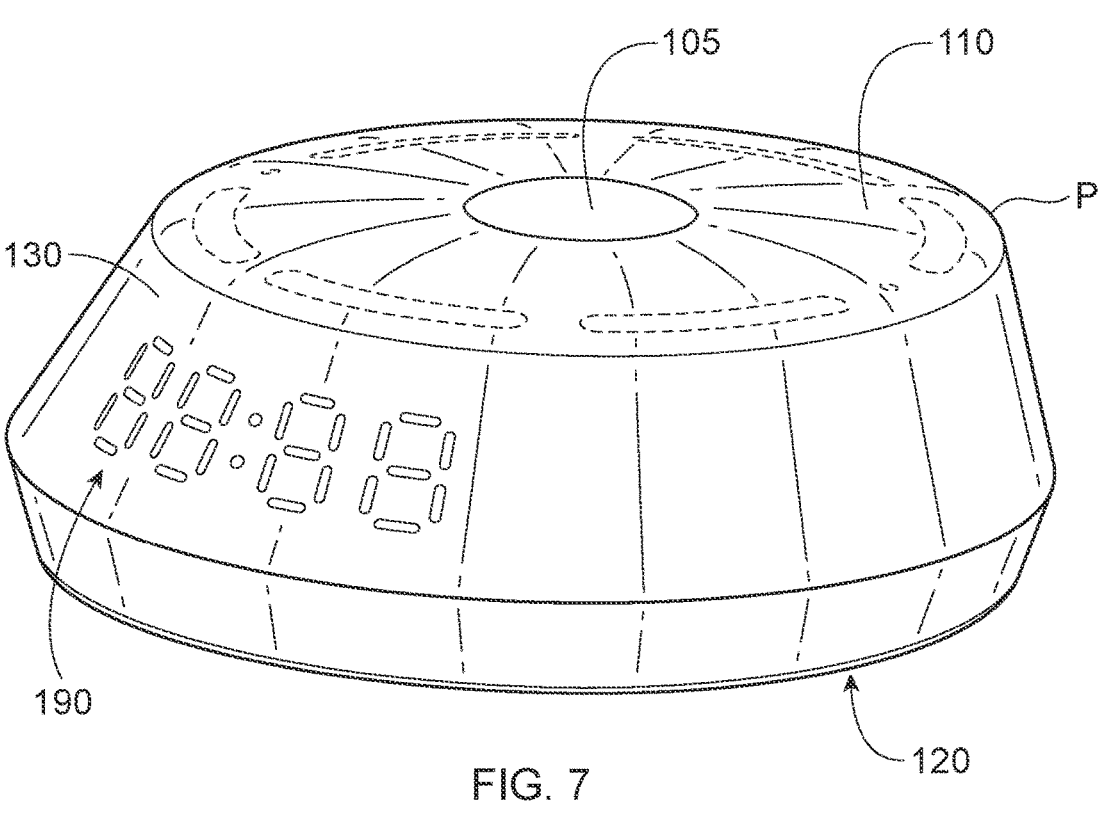
FIG. 7 is a schematic perspective view of the universal base of the present disclosure according to another embodiment.
Figure 8:
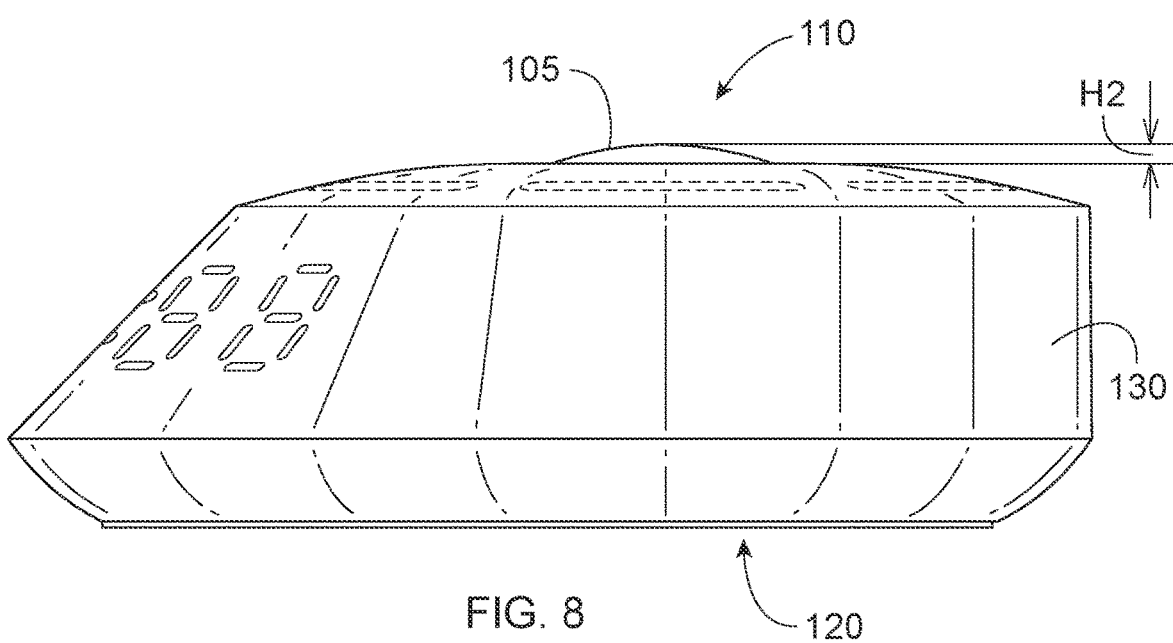
FIG. 8 is a schematic side view of the base shown in FIG. 7.
Figure 9:
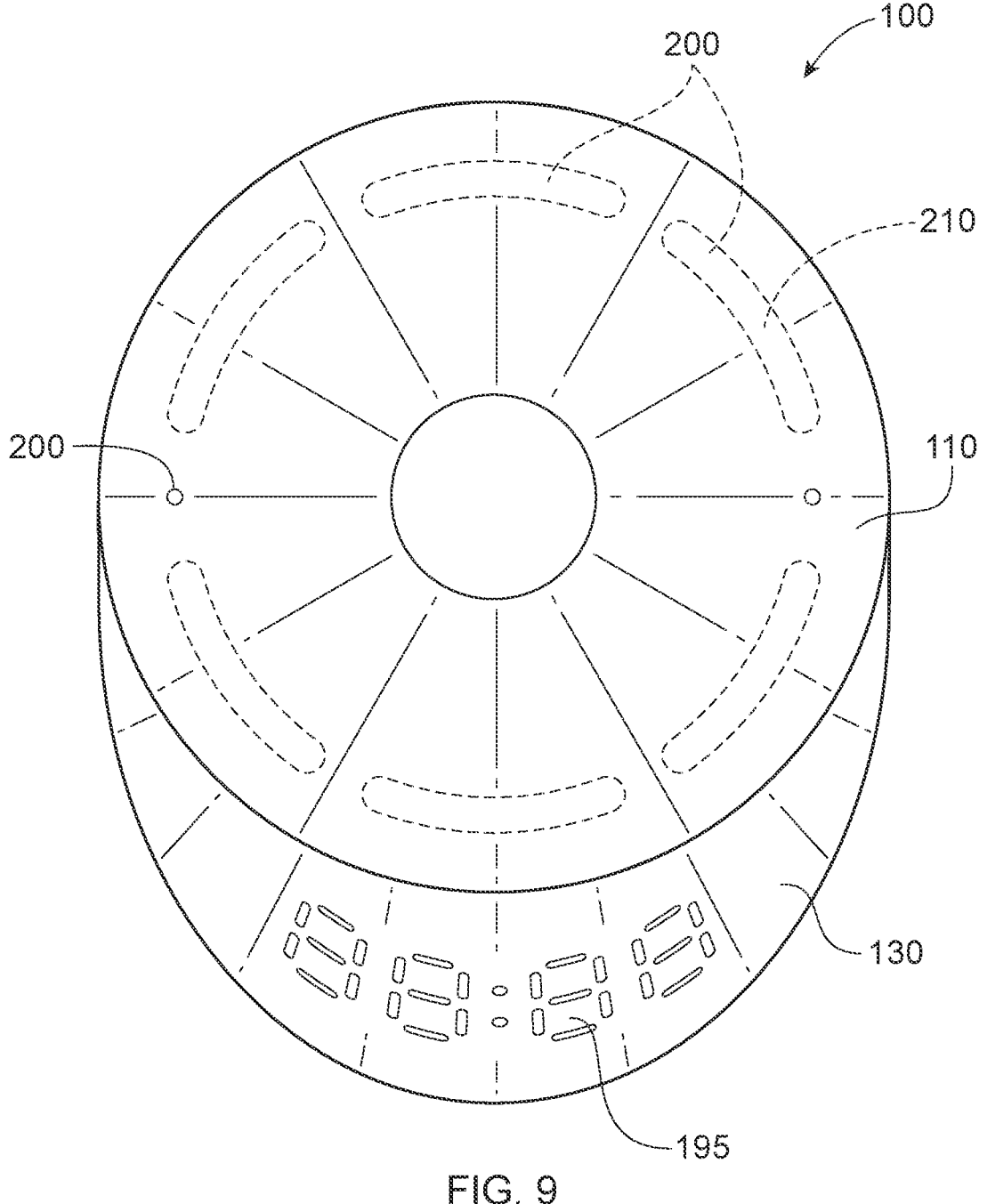
FIG. 9 is a schematic top view of the base shown in FIG. 7.

In the embodiment of FIGS. 1-6, the side surface 130 is disposed at an included angle A (FIG. 4) of about 90 degrees relative to the bottom surface 120. As used herein, the term "angle of about 90 degrees" includes any angle between 85 degrees and 95 degrees. In another embodiment, FIGS. 7-9, at least a portion of the side surface 130 can be disposed at an included angle A of less than about 90 degrees, e.g., an angle A can be about 80 degrees, or about 75 degrees, or about 70 degrees, or about 65 degrees, or about 60 degrees, or about 55 degrees, or about 50 degrees, or about 45 degrees, or about 40 degrees, or about 35 degrees, relative to the bottom surface 120. In such an embodiment, the timer-clock component 190 may be configured to display information at the inclined portion of the side surface 130—which could make it easier for a user to read.

In either embodiment, the top surface 110 can be structured and configured to be substantially smooth and devoid of recesses, edges, and corners susceptible to accumulation of residual dentifrice. As used herein, the term "smooth" refers to the surface's quality of having an even and regular exterior or consistency, free from perceptible sharp projections, recesses, corners, lumps, edges, indentations, and the like, susceptible to accumulation of residual dentifrice.

A charging component 150, for inductively charging an electric toothbrush 155 placed upon the base's top surface 120, may have any suitable design known in the art of inductive charging. The charging component 150 could be located adjacent to the central portion 105 of the base's top surface 110. The base 100 may beneficially comprise a magnetic element 140 (FIG. 6) structured and configured to form a magnetic connection with an electric toothbrush 155 when the toothbrush 155 is received by the base 100 for inductive charging of its rechargeable battery, FIGS. 1 and 2. An electric toothbrush 155, or a handle for an electric toothbrush, having a maximal equivalent diameter dmax, can be placed, in a vertical position, on the top surface 110 of the base 100, wherein the magnetic connection between the base's magnetic element 140 and the magnetic element of the toothbrush handle is established, thereby facilitating an inductive coupling between the transmitter coil of the base 100 and the receiver coil of the toothbrush 155, thus enabling wireless charging of the battery disposed in the toothbrush handle.

The base 100 further comprises a BLUETOOTH® wireless data transfer component 160 (FIG. 3) for receiving and sending usage data from the electric toothbrush 155 during a brushing session, an analyzing component 180 arranged for instantaneous processing of the usage data received from the electric toothbrush 155 during the brushing session, and a multi-functional light component 200 for communicating, instantaneously during the brushing session, at least one element of the usage data. In one embodiment, the base 100 includes a WLAN (Wi-Fi) component 170, for communicating the usage data between the base 100 and at least one of a smart-device application, such as, e.g., those used on smart phones and tablets, another universal base, and the cloud. The WLAN component 170 may have any suitable design known in the art. An analyzing component 180 arranged for instantaneous processing of the usage data received from the electric toothbrush 155 during the brushing session may have any suitable design known in the art.

A timer-clock component 190 (FIGS. 1 and 2), including a timer-clock display 195, can be structured and configured to function as a timer, displaying a count-up or a countdown of the brushing session during the brushing session. In addition, the timer-clock component 190, can be configured to display the time of day before and after the brushing session.

A multi-functional light component 200 for communicating, instantaneously during the brushing session, at least one element of the usage data can be beneficially located at the top surface 110 of the base 100. The multi-functional light component 200 can be arranged to communicate, during a brushing session, the usage data relating to at least one usage property selected from the group consisting of a battery charging status, a pressure applied by a user during the brushing session, a position or orientation of the toothbrush relative to the teeth of the user, a portion of the teeth being brushed, a progress of the brushing session, including an estimation of a portion of completion of brushing of pre-designated dental surfaces, and any combination thereof.

The multi-functional light component 200, located at the top surface 110, comprises a plurality of curved light segments 210 positioned adjacent to, and substantially equidistantly from, the outer perimeter of the top surface 110. The plurality of curved segments 210 form, in combination with one another, a circle having a second diameter D2 concentric with the first diameter D1. The second diameter D2 can be from about 35 mm to about 75 mm, or from about 45 mm to about 65 mm, or from about 50 mm to about 60 mm. The timer-clock component 190 may be configured to display information, via the display 195, at the annular side surface 130.

Figure 5:
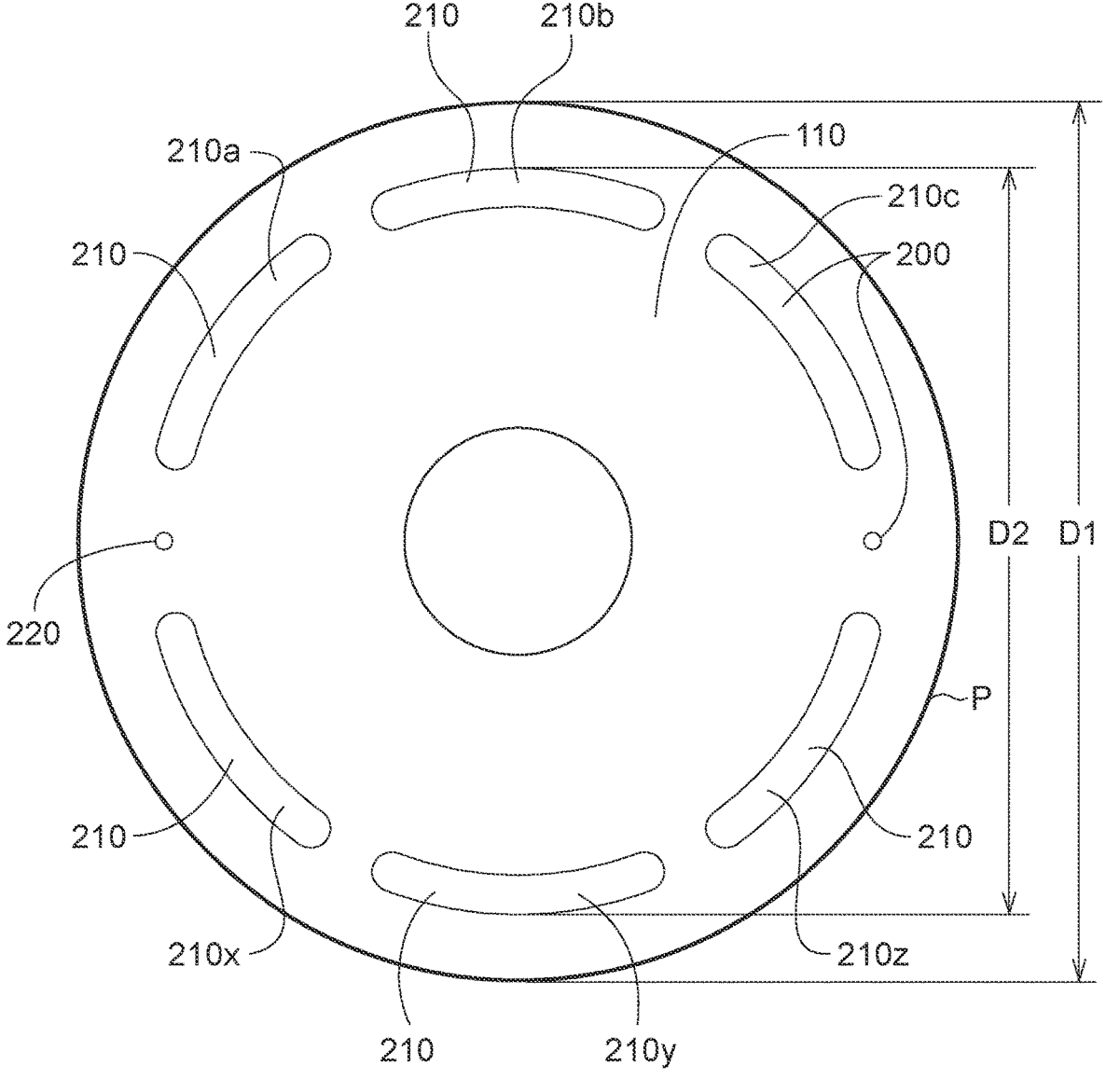
FIG. 5 is a schematic top view of the base shown in FIG. 1, wherein light segments are visible.
Figure 6:
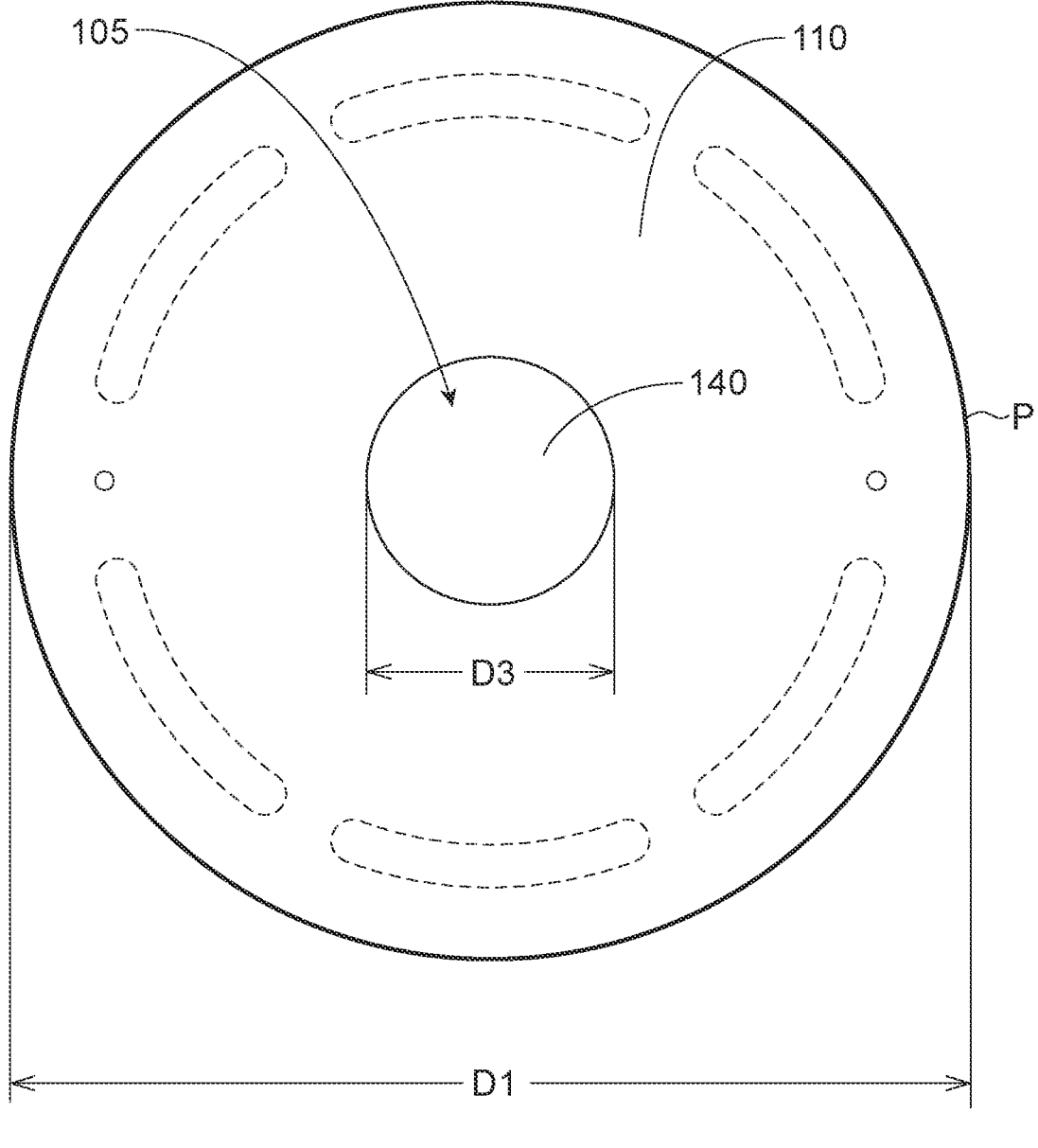
FIG. 6 is a schematic top view of the base shown in FIG. 1, wherein light segments are invisible.

In one embodiment, the six light segments 210 are arranged to communicate, during a brushing event, the usage data reflecting brushing of the maxillary (upper) teeth and the mandibular (lower) teeth. As is best shown in FIG. 5, the six light segments 210 are divided into two sections, each consisting of three light segments 210, equidistant from one another, the two sections being separated from each other by two relatively small light "buttons" 220 (shown round as an example) disposed at opposite sides of the top surface 110. In the embodiment shown, the three "upper" curved light segments 210 (210*a*, 210*b*, and 210*c*) represent three corresponding parts of the maxillary dentition (upper teeth), while the three "lower" curved light segments 210 (210*x*, 210*y*, and 210*z*) represent three corresponding parts of the mandibular dentition (lower teeth).

Stated differently, the light component 200 comprises, in the embodiment of FIG. 5, six light segments: 210*a*, 210*b*, 210*c*, 210*x*, 210*y*, 210*z*, each being arranged to communicate the usage data with respect to brushing at least one portion of the teeth comprising (1) a portion including maxillary (upper) left posterior dentition, (2) a portion including maxillary (upper) right posterior dentition, (3) a portion including maxillary (upper) anterior dentition, (4) a portion including mandibular (lower) left posterior dentition, (5) a portion including mandibular (lower) right posterior dentition, and (6) a portion including mandibular (lower) anterior dentition. The light component 200 may be structured and configured to communicate the usage data with respect to brushing of buccal, lingual, and occlusal surfaces of posterior dentition and buccal, lingual, and incisal surfaces of anterior dentition.

In another embodiment (not shown), the plurality of curved light segments of the multi-functional light component 200 may comprise four curved segments—or any other suitable number (e.g., eight)—of light segments.

A manner in which the usage data are communicated can be chosen to include such characteristics as the light's change of color, geometry, intensity, frequency (if the light pulsates), and any combination thereof. For example, a segment 210 exhibiting color red or yellow could indicate that brushing of a particular portion of the dentition (represented by a given light segment) has not been completed, while color green could indicate that the brushing of the dentition's portion is completed. As another example, a pulsating light may indicate an excessive pressure applied during brushing, while a steady light may indicate a normative pressure. Alternatively or additionally, an excessive pressure may be indicated by a steady (e.g., red) light. Also, the multi-functional light component 200 can be arranged to provide an indication that the brushing session has exceeded a threshold of time or a threshold of coverage.

In one embodiment, the base 100 may comprise an audio component including a speaker 199 (schematically shown in FIG. 1) for communicating information and/or usage data to a user. This information may include greetings, instructions, and warnings (e.g., "excessive pressure!" and the like). It is contemplated that the speaker 199, either mono or stereo, can be arranged for playing music, news, weather, and other announcements, as is known in the art.

The light component 200 may be structured and configured to be visible (FIG. 5) during the brushing session and not visible (FIG. 6) before and after the brushing session. This can be achieved by applying suitable substances (lacquers) to the surface of the light component 200, as is known in the art. In one embodiment, the light component may be structured and configured to emit light selected from the group consisting of ambient light and night light before and after the brushing session.

The light component 200 may be further structured and configured to emit light having at least one of a first personalized color and a first personalized brightness chosen by a first user. In one embodiment, the light component 200 can be structured and configured to emit light having at least one of a second personalized color and a second personalized brightness chosen by a second user, wherein the first personalized color differs from the second personalized color and the first personalized brightness differs from the second personalized brightness. The light component 200 may be structured and configured to comprise a plurality of light segments, each being arranged to communicate the usage data with respect to brushing various portions of the teeth of a particular user.

In one embodiment, the base 100 may comprise a WLAN (Wi-Fi) component 170 (FIG. 3) for communicating the usage data between the base 100 and at least one of a smart-device application and the cloud. The base 100 may further comprise a transmitter or transceiver for transmitting data to an analyzer that may be realized as a remote processing device, such as, e.g., a cloud computer. The transmitter or transceiver may have a WLAN communication capability, e.g., Wi-Fi. The base 100 may be arranged to establish a wired or wireless communication link with the electric toothbrush 155, based, e.g., on Bluetooth™ or Bluetooth™ LE). A wired communication may be established when the electric toothbrush 155 is placed on the base 100. Then, the electric toothbrush 155 may not need to have its own transmitter or transceiver for transmitting sensor (or other date), as this would be handled by the base 100 that includes the analyzing component 180.

In one embodiment of the base 100, the analyzing component 180 is arranged for classifying the usage data with respect to at least one set of at least two usage classes relating to different usage properties. The analyzing component 180 can be arranged for assembling a temporally successive sequence of input tuples of usage data relating to a time period of the brushing session. Each of the input tuples can comprise at least one element representing the usage data at the respective time instant and for inputting the sequence of input tuples into at least one artificial neural network arranged to output at least one output tuple comprising a number of elements in accordance with the number of usage classes. Each element of the output tuple can represent a prediction value that the usage of the consumer device at the given time instant relates to a respective usage class. The analyzing component 180 can be arranged to determine a single usage class answer for the time period based on the sequence of output tuples.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests, or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. An electric toothbrush (155), in combination with a universal base (100), wherein the base is structured and configured to receive the toothbrush (155) for wirelessly charging the toothbrush and to be coupled with the toothbrush for wireless communication between the base and the toothbrush, wherein the base (100) has a body (101) having smooth top surface (110), a center portion (105) in the top surface (110) having the shape of a convex generally smooth protrusion, a bottom surface (120) opposite to the top surface (110), and a side surface (130) extending between the top and bottom surfaces (110, 120), the base comprising:

a magnetic element (140) for forming a magnetic connection with the electric toothbrush (155) when the toothbrush (155) is received by the base (100) for charging, wherein the magnetic element (140) is disposed in the center portion (105) of the top surface (110);

a charging component (150) for inductively charging the electric toothbrush (155) when the toothbrush (155) is received by the base (100) for charging;

a wireless data transfer component (160) for receiving usage data from the toothbrush (155) during a brushing session;

an analyzing component (180) arranged for instantaneous processing of the usage data received from the toothbrush (155) during the brushing session;

a timer-clock component (190), including a timer-clock display (195) located on a side surface of the base, for displaying (a) either a count-up or a countdown of the brushing session during the brushing session, and (b) time of day before and after the brushing session; and a multi-functional light component (200) located on the top surface (110) for instantaneously communicating, during the brushing session, at least one element of the usage data;

wherein the body (101) of the base (100) has a substantially circular shape, wherein each of the top and bottom surfaces (110, 120) is substantially round and the side surface (130) is annular, the top surface (110) having an outer perimeter (P) having a first diameter (D1) from about 45 mm to about 90 mm, wherein the multi-functional light component (200) is disposed at the top surface (110) adjacent to the outer perimeter (P) thereof and comprises a plurality of curved segments (210) positioned substantially equidistantly from the outer perimeter P, the plurality of curved segments (210) forming, in combination with one another, a circle having a second diameter (D2) from about 35 mm to about 75 mm, the second diameter (D2) being concentric with the first diameter (D1).

2. The electric toothbrush, in combination with a universal base, of claim 1, wherein the at least one element of the received usage data is selected from the group consisting of a battery charging status, a pressure applied by a user during the brushing session, a position or orientation of the toothbrush relative to the teeth of the user, a portion of the teeth being brushed, a progress of the brushing session, an indication that the brushing session is completed, an indication that the brushing session exceeded a threshold of time or a threshold of coverage, and any combination thereof.

3. The electric toothbrush, in combination with a universal base, of claim 1, wherein the light component (200) is visible during the brushing session and invisible before and after the brushing session.

4. The electric toothbrush, in combination with a universal base, of claim 1, wherein the light component (200) emits light selected from the group consisting of ambient light and night light before and after the brushing session.

5. The electric toothbrush, in combination with a universal base, of claim 1, wherein the light component (200) emits light having at least one of a first personalized color and a first personalized brightness chosen by a first user.

6. The electric toothbrush, in combination with a universal base, of claim 5, wherein the light component (200) emits light having at least one of a second personalized color and a second personalized brightness chosen by a second user, wherein the first personalized color differs from the second personalized color and/or the first personalized brightness differs from the second personalized brightness.

7. The electric toothbrush, in combination with a universal base, of claim 1, wherein the light component (200) comprises a plurality of light segments (210) communicating the usage data with respect to brushing various portions of the teeth of a user.

8. The electric toothbrush, in combination with a universal base, of claim 7, wherein the light component (200) comprises at least six segments (210*a*, 210*b*, 210*c*, 210*x*, 210*y*, 210*z*) communicating the usage data with respect to brushing at least six portions of the teeth comprising a portion including upper left posterior dentition, a portion including upper right posterior dentition, a portion including upper anterior dentition, a portion including lower left posterior dentition, a portion including lower right posterior dentition, and a portion including lower anterior dentition.

9. The electric toothbrush, in combination with a universal base, of claim 8, wherein the light component (200) communicates the usage data with respect to brushing each of buccal, lingual, occlusal, and incisal surfaces of the maxillary and mandibular teeth.

10. The electric toothbrush, in combination with a universal base, of claim 1, wherein the base (100) comprises an audio component including a speaker (199).

11. The electric toothbrush, in combination with a universal base, of claim 1, wherein the base (100) comprises a WLAN component (170) for communicating the usage data between the base and at least one of a smart-device application, another universal base, and a cloud.

12. The electric toothbrush, in combination with a universal base, of claim 1, wherein the smooth top surface (110) is devoid of sharp projections, recesses, edges, and corners susceptible to accumulation of residual dentifrice and products of waste resulting from brushing.

13. The electric toothbrush, in combination with a universal base, of claim 1, wherein the first diameter (D1) is from about 60 mm to about 75 mm.

14. The electric toothbrush, in combination with a universal base, of claim 1, wherein the second dimeter (D2) is from about 45 mm to about 65 mm.

15. The electric toothbrush, in combination with a universal base, of claim 1, wherein the electric toothbrush (155) has a maximal equivalent diameter (dmax) and is structured and configured to be disposed in a vertical orientation on the top surface (110) of the base (100) for inductive coupling therewith, and wherein the first diameter (D1) is at least 2 times greater than the maximal equivalent diameter (dmax) of the toothbrush (155).

16. The electric toothbrush, in combination with a universal base, of claim 1, wherein the plurality of curved segments (210) of the multi-functional light component (200) comprises at least four curved segments.

17. The electric toothbrush, in combination with a universal base, of claim 16, wherein the plurality of curved segments (210) of the multi-functional light component (200) is arranged to communicate the usage data with respect to brushing multiple portions of the teeth selected from the group consisting of a portion including maxillary left posterior dentition, a portion including maxillary right posterior dentition, a portion including maxillary anterior dentition, a portion including mandibular left posterior dentition, a portion including mandibular right posterior dentition, a portion including mandibular anterior dentition, portions of buccal, lingual, and occlusal surfaces of posterior dentition, and portions of buccal, lingual, and incisal surfaces of anterior dentition.

18. The electric toothbrush, in combination with a universal base, of claim 1, wherein the base (100) has a height (H1) of from about 20 mm to about 40 mm, measured from a lowest point of the bottom surface (110) to a highest point of the top surface (120), wherein the highest point is situated at or adjacent to a geometric center (151) of the top surface (110), and wherein the highest point is part of a central portion (105) of the top surface (110), which central portion (105) has a shape of a convex and smooth protrusion having a convex curvature having a radius (Rc) of from about 15 mm to about 35 mm and a plane-view diameter (D3) of from about 10 mm to about 35 mm.

19. The electric toothbrush, in combination with a universal base, of claim 18, wherein the convex and smooth protrusion of the central portion (105) has a generally parabolic shape and wherein the convex and smooth protrusion of the central portion (105) has a height (H2) of from about 0.5 mm to about 3 mm.

\* \* \* \* \*